May 1, 1934.    R. D. SHAW    1,957,296
CUTTER RELIEVING LATHE
Filed March 17, 1932    6 Sheets-Sheet 2

Fig. 2.

INVENTOR
Robert D. Shaw
BY
M. H. Lockwood
ATTORNEY

May 1, 1934.　　　　R. D. SHAW　　　　1,957,296
CUTTER RELIEVING LATHE
Filed March 17, 1932　　　6 Sheets-Sheet 6

Patented May 1, 1934

1,957,296

UNITED STATES PATENT OFFICE 1,957,296

CUTTER RELIEVING LATHE

Robert D. Shaw, Hartford, Conn., assignor to Pratt & Whitney Company, Hartford, Conn., a corporation of New Jersey Application March 17, 1932, Serial No. 599,430

29 Claims. (Cl. 82—19)

This improvement relates primarily to cutter relieving lathes for relieving helically gashed cutters of various types, but particularly undercut form cutters, and to mechanism for advancing or retarding the rotation of one member as an incident to changing the angular position of that member relative to another. It has been the practice heretofore, as disclosed in Muller Patent No. 1,512,631 of October 21, 1924, to relieve helically gashed cutters by advancing or retarding the angular position of the relieving cam by suitable gear connections between the spindle for the cutter and the shaft or gears driving the cam, so that the longitudinal feed or position of the tool carriage will control the angular position of the cam for the required advance or retard.

A very complete disclosure of a relieving lathe for form cutters is found in Muller Patent No. 1,429,617 of September 19, 1922, wherein the angular position of the spindle carrying the cutter is advanced or retarded according to the longitudinal position of the tool slide, by suitable intermediate gearing. This patent also discloses gear mechanism for controlling the angular position of the cam independently of the spindle controlling mechanism to take care of undercut or rake of the teeth of the cutter.

Helically gashed form cutters, with rake or undercut, wherein the teeth are relieved according to the undercut or rake and also according to the lead of the helical gash are more particularly described in Muller Patent No. 1,443,641 of January 30, 1923.

The present improvement proposes an entirely new method of control for relieving the teeth of helically gashed cutters with undercut or front rake, and it is believed the electrical control through a differential gear of the angular position of one rotating member relative to another provides a particularly novel method which may be found applicable to various types of machines, and may be adapted for either type of relieving lathe described in the Muller patents mentioned.

In this improved method of relieving cutter teeth it is proposed to control the advance or retard of the angular position of the relieving cam relative to the spindle entirely by means of a tracer following a straight edge template, the tracer having electrical contacts controlling circuits of the respective clutches of a two-clutch magnetic clutch unit geared to the floating gears of a differential. The angle of the edge of the template to the direction of motion of the tool slide represents the angle of lead of the cutter, and may be adjusted to any desired angle.

Form cutters that are helically gashed are more difficult to relieve, particularly when the teeth are undercut or provided with front rake, for the undercut surface does not extent radially of the cutter and, therefore, the edges of the teeth at different diameters are not in the same radial planes, as illustrated in Muller Patent No. 1,443,-641. In the present improvement, it is an object to utilize an angularly adjustable electric contact tracer for advancing and retarding the angular position of the relieving cam, in accordance with variations in the diameter of the form cutter being relieved, changes in the angular position of the cam according to the angle of lead being controlled by the angle of the template.

The main object of the present improvement is to independently control a differential gear mechanism for advancing and retarding the angular position of the relieving cam. Preferably the floating or idler gears of the differential are mounted upon a cage or member, which may be rotated to circumferentially displace the floating gears to advance or retard the angular position of the cam.

A further object is to connect the floating gear supporting member of the differential for rotation in either direction by means of a pair of magnetic clutches, motor driven in opposite directions, and to control the energization of the respective magnetic clutches by an electric contact tracer lever cooperating with a suitable template representing the angle of the gash in the cutter.

In the present improvement, it is proposed to utilize well known power driven magnetic clutch units for operating the longitudinal and cross feeds of the lathe and particularly to control the cross feed by means of an electric tracer following a template having an edge conforming to the outline of the form cutter. This type of lathe control by electric tracer is shown and described in Patent No. 1,711,290, to John C. Shaw. Obviously, however, the "former and former pin" mechanism for controlling the position of the cross feed tool carriage for form cutters with different diameters, as described in Muller Patent No. 1,429,617 may be employed. The present invention will be particularly described in connection with the form of lathe described in Patent 1,711,290 to which the relieving mechanism may be directly applied without modification of the tracer controlling mechanism shown and described in that patent.

It is further proposed in the present improvement to provide a tracer or follower with contacts for closing circuits to the respective magnetic clutches for energizing the clutches of the floating section of the differential to advance or retard the angular position of the cam, as the cross feed is operated under the control of its tracer or former pin while following the surface of a former or pattern representing the outline of the form cutter. In the present instance the improved tracer for controlling the angular position of the relieving cam is arranged to take care of the change in circumferential position of the edges of the teeth to be relieved, which as explained, changes with reference to a radial plane according to the angle of undercut or rake of the tooth. In connection with this improved tracer which is provided with a radius arm, a further object is to provide means for adjusting the angle of engagement of the tracer radius arm with the template in order that the angle may be varied according to the angle of rake or undercut of the tooth.

The lathe attachment herein described is intended for universal use in relieving either plain or form cutters, either straight or helically gashed and also cutters with the helical gash either to the right or to the left, and with any required angle of lead. Accordingly, the radius arm tracer or follower and template are mounted for relative longitudinal and cross feed movements and a suitable mounting is provided for changing the angular position of the template to conform to the angle of lead of the gash, whether right or left helical, or if longitudinally straight teeth are to be relieved.

It has been pointed out that the advance or retard of the angular position of the relieving cam is controlled by changing the relation of the floating gears in the differential and this is preferably controlled by means of the tracer radius arm following the edge of the template when the latter is adjusted to correspond with the lead of the gash in the cutter. In order to provide for direct control of the advance or retard by the radius arm tracer through the differential, a rotatable member supporting the floating gears of the differential is geared to a sliding rack or bar supporting the tracer, the bar being longitudinally movable in a plane parallel to the plane of the template.

One form and adaptation of the improved cutter relieving lathe is represented in the accompanying drawings, in which.

In the present improvement, the mechanism is preferably attached to a relieving lathe of the usual or any preferred construction wherein the spindle carrying the cutter is rotated, and substantially the usual means are provided for obtaining the required longitudinal and cross feeds. Preferably, however, the longitudinal and cross feeds may be operated by magnetic clutch units adapted to be controlled by a tracer following a pattern representing the contour of the cutter, substantially as described in the beforementioned Shaw Patent No. 1,711,290, (or mechanically as in Muller previously mentioned).

The present improvement relates to features of the mechanism for controlling the advance and retard of the angular position of the cam by means of a special form of tracer arranged to follow the edge of a template or other suitable control surface. The lathe 1, having the usual bed, is provided with longitudinally extending slide ways 2 and the usual head 3, in which the spindle 4 is mounted and adapted for rotating the cutter to be relieved, indicated at 5 by dotted lines in Fig. 1.

Figures 9, 10:
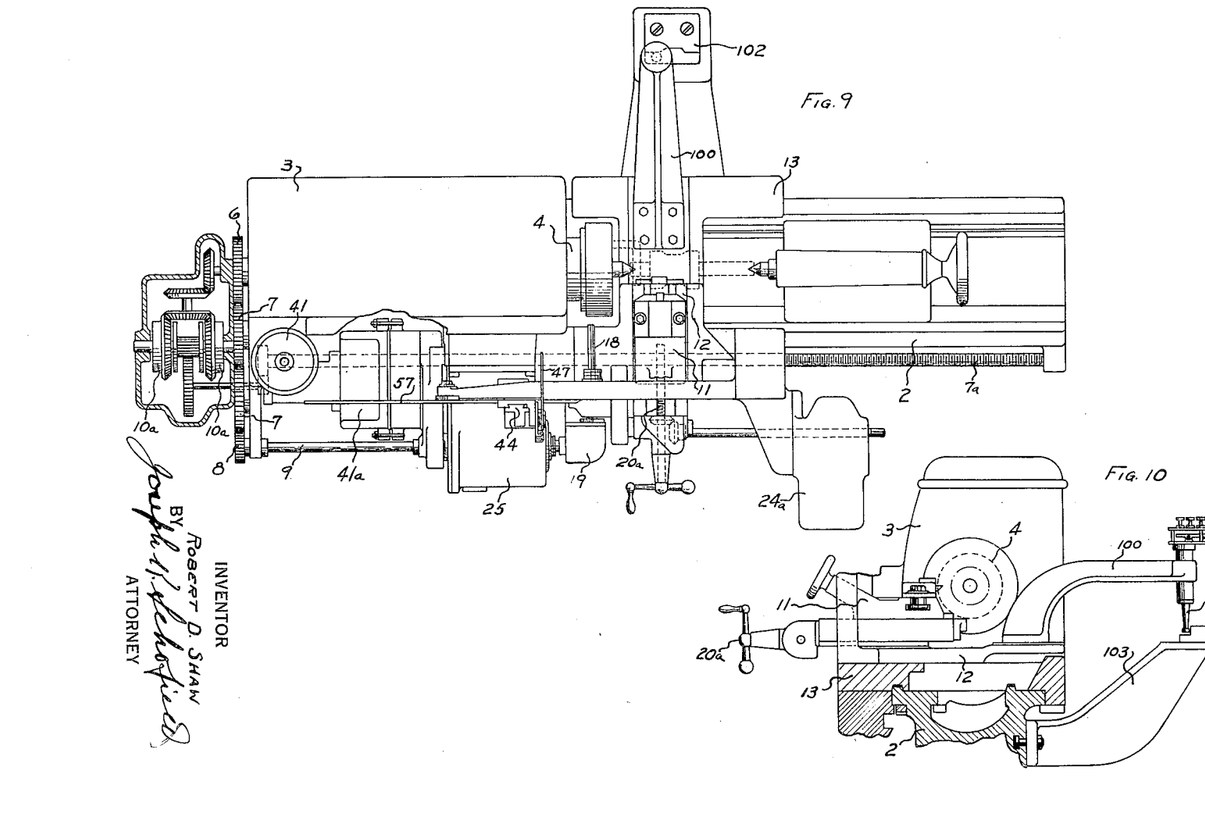
Fig. 9 is a complete plan view of a lathe of the type shown in Patent 1,711,290 having the invention applied thereto.
Fig. 10 is a transverse sectional view of the lathe carriage and template bracket.

Slidable on the ways 2 is a carriage 13 having a cross slide 12 thereon. The rear end of the cross slide 12 may be provided with a bracket 100 in which is secured a tracer 101. The lower end of this tracer engages a template 102 conforming in outline to the shape of the cutter 5 being relieved. As shown in Fig. 10, the template 102 is supported in fixed position by being clamped rigidly to a horizontal surface of a bracket 103, bolted or otherwise secured to the rear surface of the bed or base 2. The tracer 101 is provided with contacts 104 to open and close electric circuits by which electro-magnets effect movements of the carriage 13 and cross slide 12 to reproduce the outline of the template 102 on the cutter 5. As the electrical circuits and the electromagnets operating means for the carriage 13 and cross slide 12 are or may be similar to those described in the above mentioned Patent 1,711,290, further description of these parts is not thought to be necessary. It will suffice to state that during the operation of the relieving device presently to be fully described the tracer 101 traverses the outline of the template 102. Simultaneously the cross slide 12 and the supplementary or tool slide 11 reciprocated by the relieving device and on which the cutting tool is mounted is moved toward and from the axis of the cutter 5 during movement of the carriage 13 longitudinally of the bed 2. To move the carriage 13 along the bed, a magnet box having magnets 10ª driven by the spindle 4 is provided which is in every way similar to those shown at 10 in Patent 1,711,290. By these magnets 10ª through their clutches and gear connections is driven the screw 7ª which is similar to that shown at 7 in this patent.

The transverse movements of the cross slide 12 to maintain the tracer 101 in contact with the template 102 are effected by magnets which may be housed within a box 24ª attached to the carriage 13 and connected to the cross screw 20ª in the same manner as to the cross screw 20 in the above referred to patent. Also as described in Patent 1,711,290, the movements of the carriage 13 and cross slide 12 by their electro-magnets may be so interlocked that but one of these members 12 or 13 may move at any one time and cutters having extremely steep sides may be accurately formed and relieved. This interlock mechanism is fully described in the above mentioned patent as well as the relays, switches and circuits by means of which the cutting tool carried by the slides 11, 12 and 13 may be made to follow any regular or irregular outline while being constantly reciprocated equal distances by the relieving mechanism and while the spindle 4 is being continuously and uniformly rotated by any usual form of rotating or driving means housed within the head 3.

Figures 3, 4:
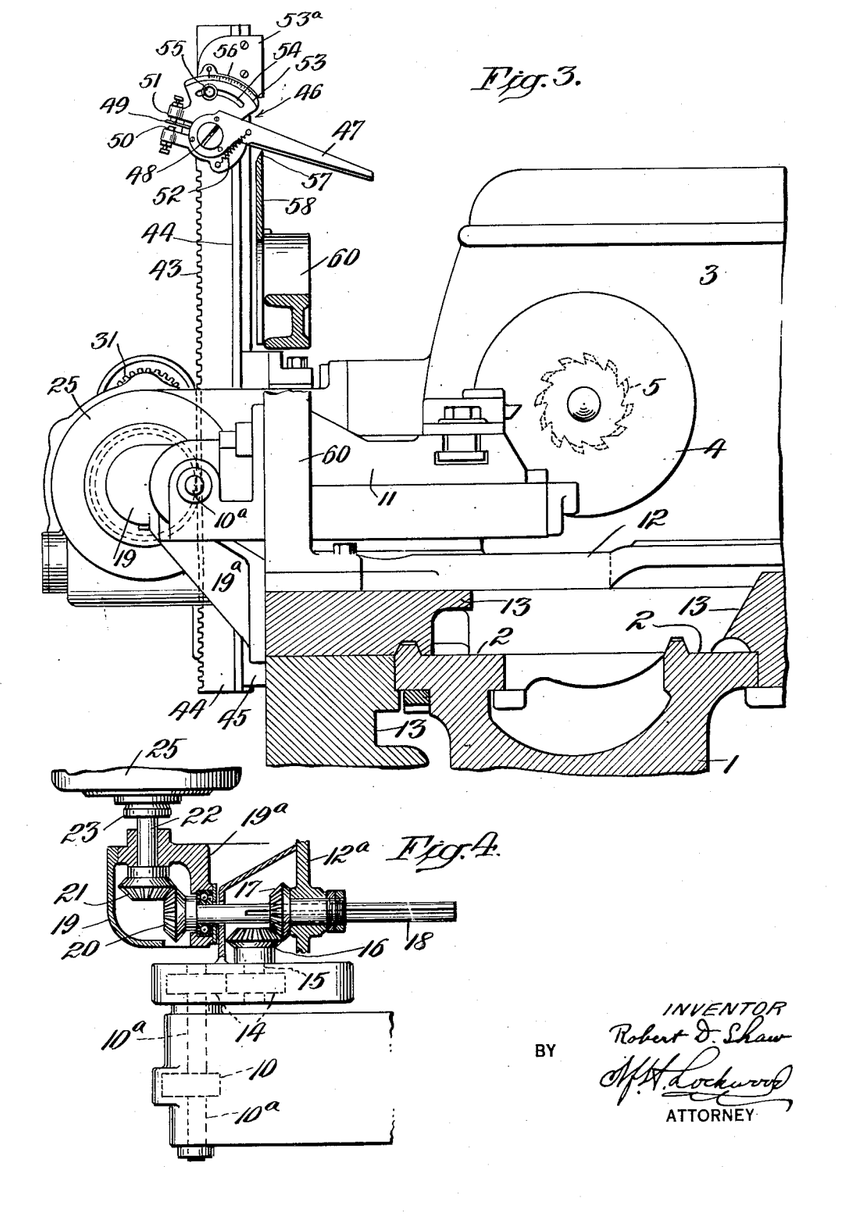
Fig. 3 is an end view and transverse section with parts of the tool carriage and cross slide broken away.
Fig. 4 is a plan and section of a portion of the cam gear drive.

The spindle 4 may be provided with the usual or any preferred gear drive for the cam, for instance a gear 6, connected through change gears 7, with a pinion 8 on the end of a longitudinally extending shaft 9, is shown as adapted to rotate the relieving cam 10 (indicated by dotted lines in Fig. 4). In the present instance this cam 10 is adapted to reciprocate the tool for the relieving operation, through a differential gear and other gears and shafts, hereinafter described. To drive the cam from the spindle 4 is according to usual practice, although it will be understood that in the present instance, driving through an intermediate differential with control thereof provides a novel arrangement which may be applied to various types of machines wherein it is desired to advance and retard the angular position of one member relative to another.

The cam 10 is connected to reciprocate the tool slide 11, supported on the cross feed slide 12, which in turn is adapted to be slidably supported for the cross feed on the usual carriage or longitudinal slide 13, which is adapted to slide on the ways 2 of the lathe and to be fed therealong by the usual lead screw, not shown.

Figure 1:
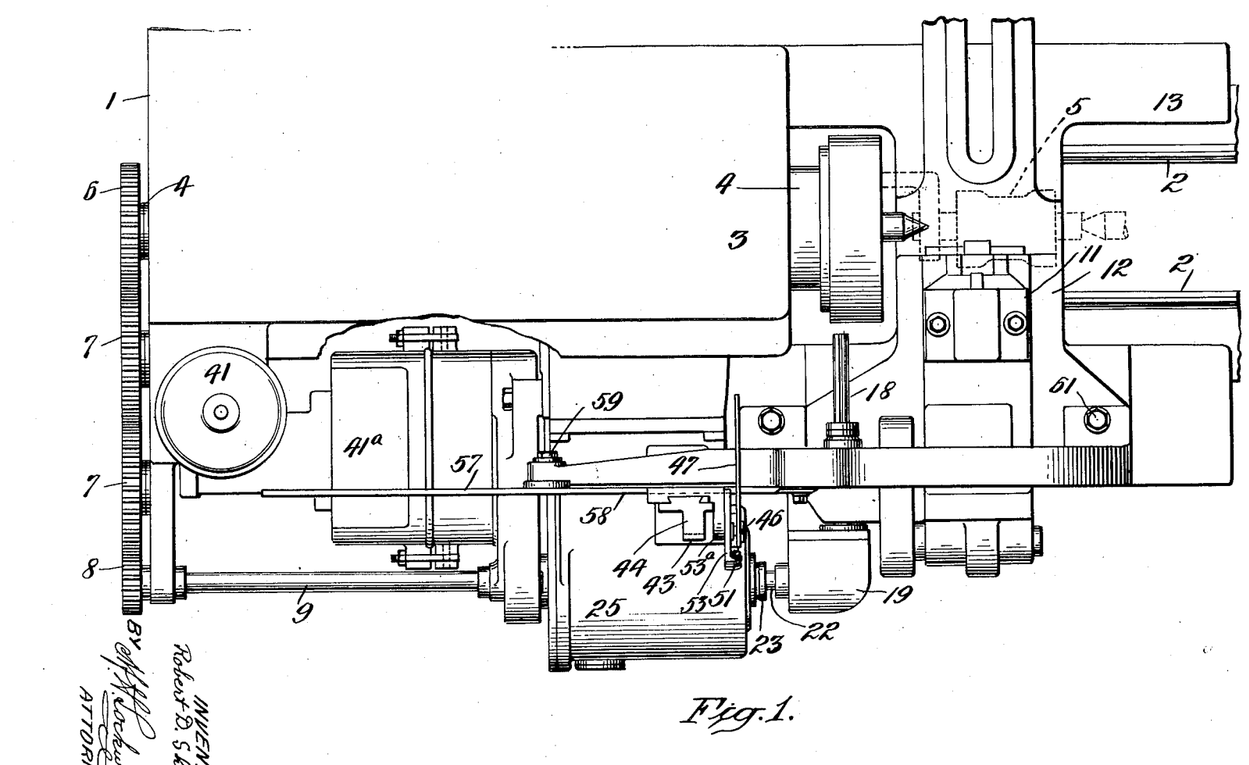
Fig. 1 is a fragmentary plan view showing a lathe of the type shown in Patent 1,711,290 with parts broken away and indicating gear connections between the spindle and a cam drive.

The relieving cam 10 is, in the present instance, shown as adapted to be rotated by a shaft 10a connected through gears 14 for rotation by a shaft 15 carrying a bevel gear 16 meshing with a similar bevel gear 17 slidably keyed to a horizontally extending splined shaft 18, extending parallel to the direction of motion of the cross feed slide 12, as will be seen in Fig. 1 of the drawings. The miter gears 16 and 17 are bracketed (12a) to the cross feed slide as shown in Fig. 4 and the splined shaft 18 permits cross feed motion of the gears with the slide while maintaining operative connection of the shaft to the cam. The shaft 18 extends into a casing 19 supported on the longitudinal slide 13 (Fig. 2) by means of a bracket 19a (see Fig. 5) and the front end of the shaft 18 is provided with a bevel pinion 20, meshing with a similar pinion 21, connected to the end of a shaft 22 having a bearing in the bracket 19a and extending from the casing 19 at right angles to the shaft 18. The shaft 22 extends parallel to the bed of the lathe and is long enough to permit required longitudinal feed, and is splined throughout its length. By means of the spline and a key the shaft 22 is at all times connected with a sleeve or quill 23 (Fig. 5) supported on ball bearings 24 in a differential gear casing 25, the casing 25 being secured in any suitable manner, as by bolts 25a, to the bed 2 of the lathe, as indicated more particularly in Fig. 5 of the drawings.

Figure 2:
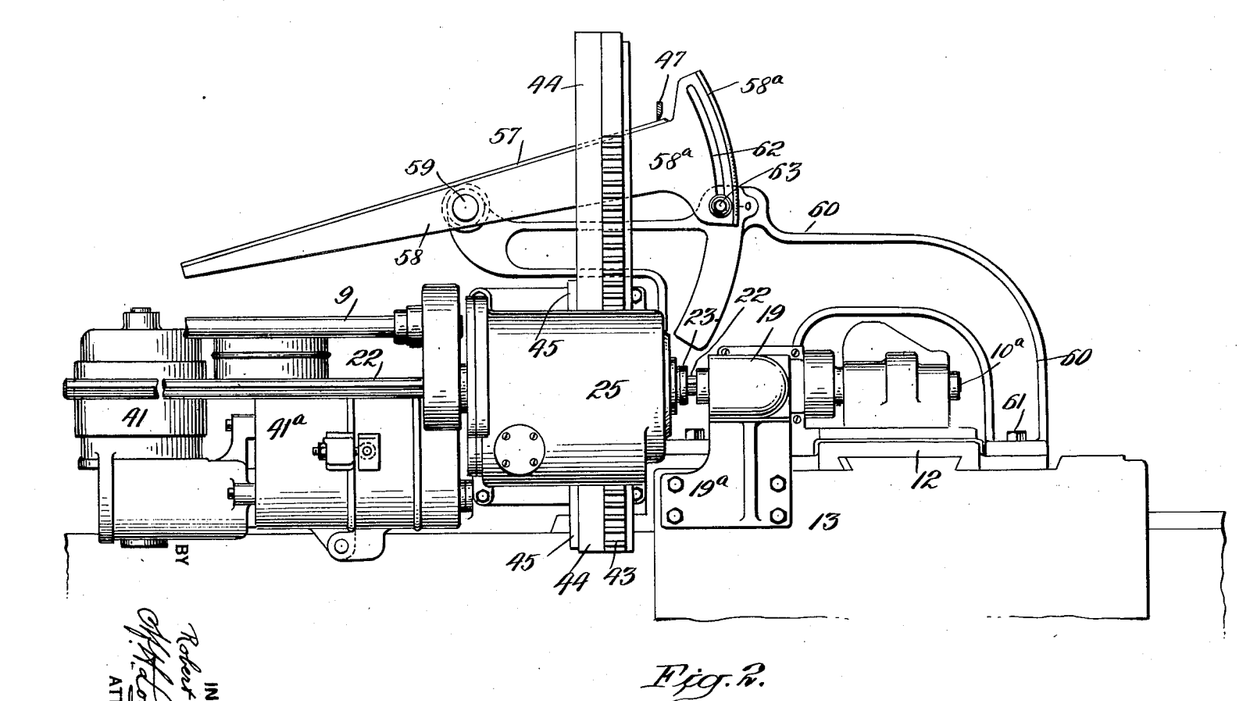
Fig. 2 is a front elevation of the improvement with certain parts broken away.

The sleeve or quill 23 has mounted thereon one of the bevel gears 26 of the differential, which, in the present instance, is the driven gear which, through the shafts 22 and 18 is adapted to rotate the cam 10. Floating or intermediate gears 27, only one of which is shown in Fig. 2, mesh with the bevel gear 26 and with the other bevel gear 28 of the differential in the casing 25. The bevel gear 28 is formed or mounted on the end of a quill or sleeve 29 extending through the casing 25 and provided outside the casing with a pinion 30, meshing with a pinion 31, mounted on the end of the spindle driven shaft 9, previously referred to as adapted to rotate the relieving cam in timed relation with the cutter carried by the spindle 4. The sleeve or quill 29 is rotatable on ball bearings 32 independently of the splined shaft 22.

The intermediate floating gears 27 of the differential are preferably rotatable upon studs 33 mounted in a cage 34, rotating in bearing 34a in the casing 25 and rotating about the quills 23 and 29, the ball bearings 24 and 32 of which are supported therein. In this manner circumferential displacement of the floating gears is provided for, to thereby advance or retard the angular position of the cam 10.

Figure 5:
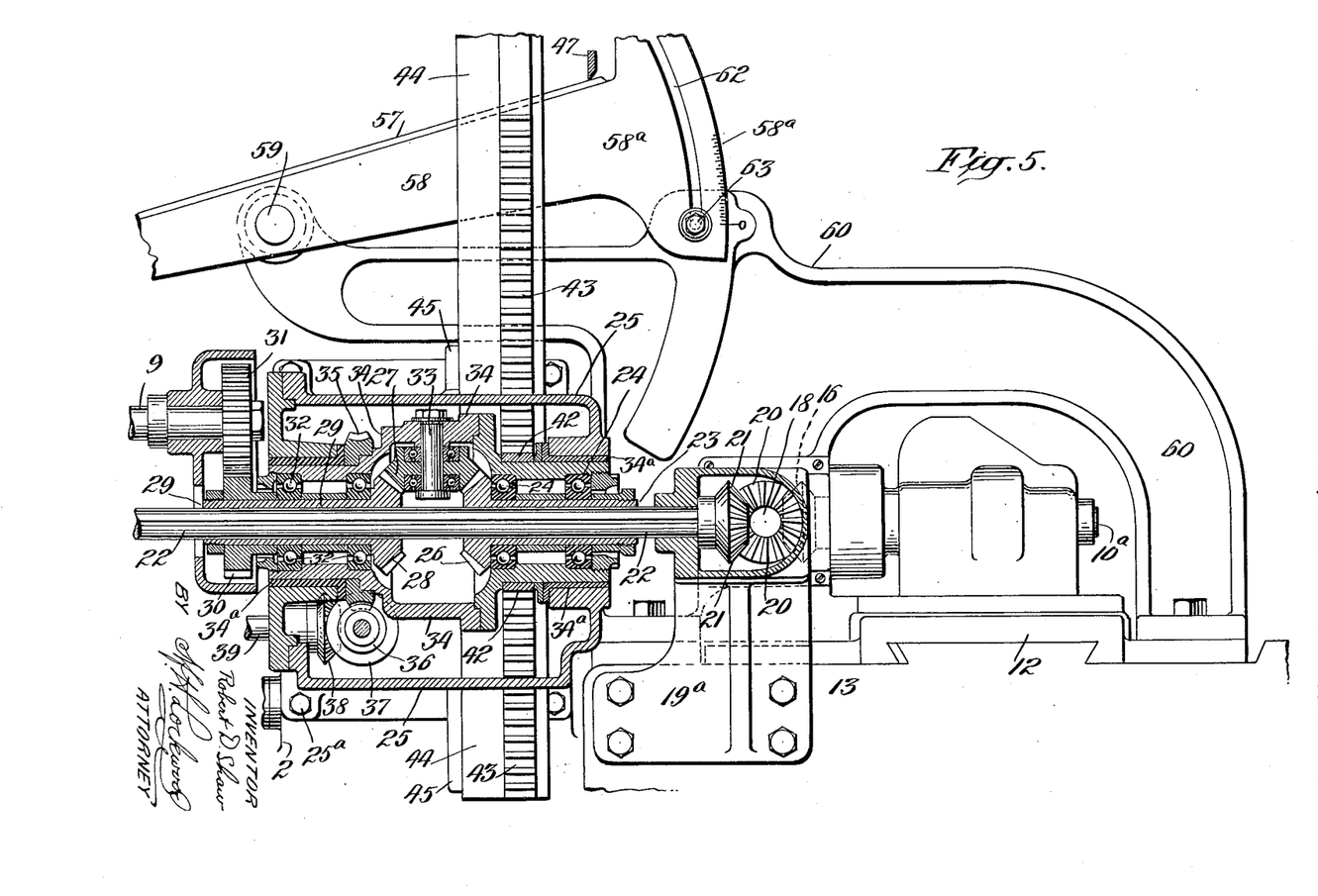
Fig. 5 is an enlarged vertical longitudinal broken away section of the differential gear and the controls.
Figure 8:
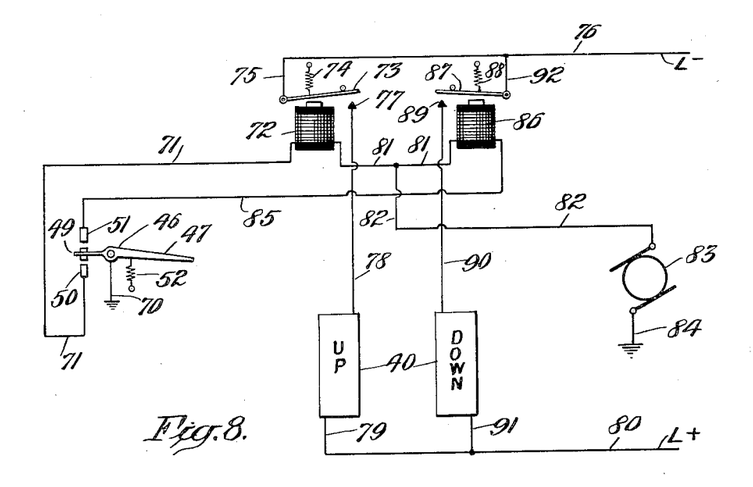
Fig. 8 is a wiring diagram showing the electrical connections for tracer control of the magnetic clutches controlling the floating gears of the differential.

The floating gear cage or casing 34 is preferably provided with a worm gear 35 secured thereto, as indicated in Fig. 5, with which a transversely extending worm 36 cooperates, the latter being adapted to hold the floating gears in any position of adjustment and to rotate the cage 34 when an advance or retard of the angular position of the cam is to be effected. The worm 36 may be rotated, for positioning the floating gears, in any suitable manner, but, in the present instance, the end of the worm 36 is provided with a bevel pinion 37 meshing with a similar bevel pinion 38 carried on the end of a shaft 39, adapted to be rotated by magnetic clutches 40, (Fig. 8). The magnetic clutches 40 are rotated in opposite directions by means of a motor 41 associated with a gear casing 41a in which the usual clutch gear drive is provided. This type of magnetic clutch gear drive is well known and a description of one form of magnetic clutch unit of this character will be found in the above mentioned Shaw Patent No. 1,711,290.

The rotatable floating gear cage 34 is provided with a spur gear 42 (Fig. 5) secured thereto, and rotatable therewith. The cage gear 42 meshes with a rack 43 formed or mounted on the lower end of a slide bar 44, which is slidable vertically through the casing 25 on slideways 45, see Figs. 1 and 5. From this construction, it will be seen that any motion of the cage 34, resulting from the magnetic clutch drive acting through the worm 36, will be communicated to the rack 43 and move the slide bar 44 up or down, thus indicating any change in the angular position of the cam 10. In order to utilize this motion for control of the angular position of the cam the slide bar 44 supports at its upper end, an electric tracer 46, (Fig. 3) carrying contacts for controlling circuits of the clutches 40. It has been pointed out that it is proposed, in the present improvement, to control the angular position of the relieving cam according to the angle of rake or undercut as the diameter of the cutter changes, or according to the lead angle, or by both jointly. Therefore, the tracer preferably comprises a lever arm 47, having a knife edge in line with the center of a pivot 48, upon which the tracer lever is pivoted, so that it may be moved to open or close the clutch control contacts. The opposite arm of the tracer lever comprises a contact blade 49 having contacts adapted to cooperate with fixed contacts 50 and 51, which are connected in circuits controlling the respective magnetic clutches 40, marked "Up" and "Down" in Fig. 8 of the drawings. The pivoted tracer arm 47 is normally drawn downward by a spring 52 so as to close the contact 51 for down motion, as will be more fully described later. The pivot 48 of the tracer arm is preferably mounted at the center point of an arcuate bracket 53, at one side of which the contacts 50 and 51 are mounted, the bracket being mounted on a supporting clamp 53a and provided with a slot 54, cooperating with a stud screw 55, the nut of which is adapted for securing the arcuate bracket in any adjusted position on the supporting clamp 53a. A graduated arc 56 may be provided for accuracy in setting the angle of the knife edge of the tracer arm 47, which angle should correspond with the angle of undercut or rake of the teeth, for this arrangement is for the purpose of relieving form cutters with front rake or undercut teeth. Screws permit the clamp 53a to be secured at the upper end of the bar 44 in proper relation to the cage of the differential.

However, the feature of controlling the angular position of the relieving cam for variations resulting from straight or undercut form cutters by a tracer following a template, being particularly novel, it will be understood that the arrangement herein shown and described is merely illustrative and any device embodying a modification, adaptation or variation for obtaining the same result may be employed.

The tracer arm 47 or rather the knife edge thereof, in the present form of the electric tracer 46, is adapted to cooperate with a suitable template in the form of an elongated bar, one of its edges constituting a straight edge, for instance the straight edge 57 of a template 58 pivotally mounted at 59 on a bracket 60, extending over the portion of the tool carriage reciprocated for the relieving operation, and secured to the cross feed slide 12 by bolts or screws 61, as indicated in Figs. 1 and 2, so as to partake of the cross feed motion, as the cross feed slide 12 is moved in and out in accordance with a template representing the varying diameters of the form cutter being relieved.

Since the in and out motion of the cross feed slide, according to the contour of the form cutter, concerns only undercut or rake of the teeth of the cutter, any form of template 58 cooperating with any suitable electric tracer 46 that will conform to the changes in angular position of the cutting edges of the teeth may be used. As previously explained, a form cutter besides having undercut teeth may have oblique teeth or the lead may be helical. Hence, the template 58 is pivoted so that the angle may be changed and an arm extending on one side of the pivot is provided with circular segment 58a having an arcuate slot 62, cooperating with a clamp screw 63 for securing the straight edge 57 of the template at any desired angle to the lead of the cutter teeth. This arrangement, therefore, will take care of the relieving of cutters whether the teeth are straight or right or left helical. The outer edge of the template segment, at 64, is preferably provided with a graduated scale adapted to cooperate with a suitable zero line for visually indicating the angular position of the edge 57 of the template.

Figure 6:
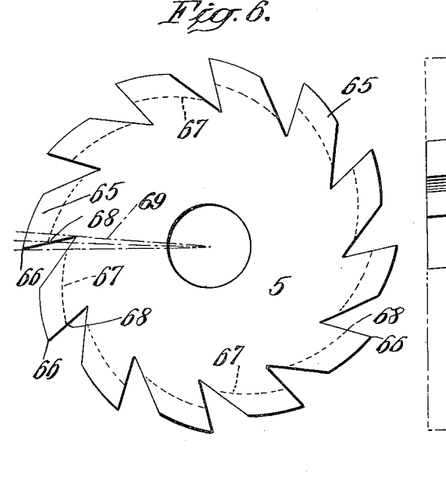
Fig. 6 is an end view of a form cutter with smaller diameter dotted and radial lines indicating edges and bottom of teeth with rake.
Figure 7:
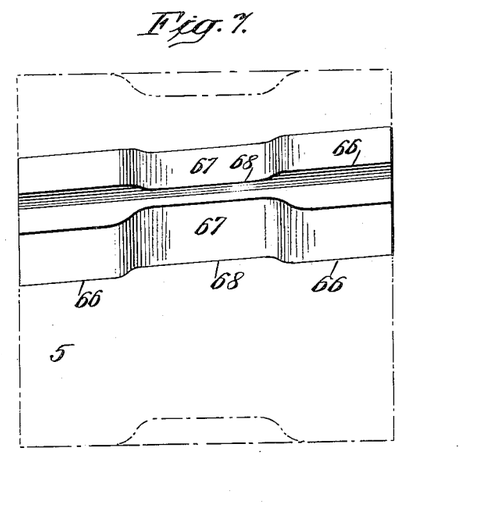
Fig. 7 is a plan view of teeth of a form cutter, such as in Fig. 6, in which the middle portion is of less diameter than the ends.

A form cutter is shown in Fig. 6, where the reduced diameter is shown dotted, and by dotted radial lines, it is intended to show the different angular positions of the cutting edges and bottom of the teeth at the two diameters showing the teeth being provided with undercut or rake, as shown. The cutter 5 (Fig. 6) is shown with teeth 65, the cutting edge of larger diameter being represented at 66 and at the left one of the teeth is shown with a radial line passing through the edge 66. The outer face of the portions of the teeth of smaller diameter are indicated by dotted lines 67 which it will be seen do not fall in the same radial plane with edges 66 of larger diameter being located at the point 68 on the undercut face, as indicated by the corresponding radial line. Still another radial line is shown as passing through the bottom corner 69 of the gash, which by comparison indicates how far away from a radial plane the rake or undercut carries the cutting edge when a portion of the tooth follows the form at reduced diameter. For clearness Fig. 6 shows the relation as if the gash were straight but substantially the same holds for helically gashed cutters. In Fig. 7 a plan view is shown representing two teeth of the form cutter of Fig. 6, from which it will be seen that the portion 67 of less diameter is displaced circumferentially so that the cutting edge 68 is considerably out of line with the larger diameter edge 66. The present improvement is particularly adapted as previously pointed out, for relieving form cutters of this character wherein the cutting edges of the different diameters of the form cutter are displaced circumferentially of the cutter as just described.

In order to understand the control of the advance or retard of the angular position of the relieving cam through the magnetic clutches 40, by the tracer 46, reference may be had to the wiring diagram of Fig. 8. In this diagram, it will be seen that the tracer 46 is grounded at 70 and the contacts on the contact blade 49, as previously explained, are adapted to cooperate with fixed contacts 50 and 51. The contact 50, referred to as the "up" contact, is connected by lead 71 in circuit with a relay magnet 72, which, when energized is adapted to draw down the contact closing armature 73, normally held open by a spring 74. The armature 73 is connected by lead 75 with the L— or negative side 76 of the high potential main line circuit. The relay armature 73 closes the main line circuit at 77 to a lead 78, connected with the "up" magnetic clutch 40, the circuit being completed through the lead 79, connected with the L+ or positive side 80 of the high potential circuit. The energizing circuit through lead 71 of the up relay magnet 72, is completed through the leads 81 and 82 to a low potential or 15 volt generator 83, which is grounded at 84 to complete the circuit.

The "down" contact 51 of the tracer is connected by lead 85 with a relay magnet 86 for actuating the "down" magnetic clutch 40, the circuit of the magnet 86 being completed through the leads 81 and 82, as indicated in Fig. 8.

The relay magnet 86 actuates an armature 87, for closing the line circuit, normally held open by a spring 88, the armature closing a contact at 89 to lead 90 for energizing the "down" magnetic clutch 40, the circuit being completed through the lead 91 to the L+ side 80. The circuit of the armature 87 is completed through lead 92 connected with the L side of the line 76.

It will be seen that the tracer lever arm 47 will normally be held by a spring 52 so as to close the "down" contact 51, to energize the "down" clutch 40, and it will be understood that this circuit will be broken during operation only, as the tracer arm 47 is lifted by contact or engagement of the knife edge thereof with the edge 57 of the template 58, representing the lead of the cutter teeth. Excessive pressure on the tracer arm 47, as when the template is moved to the left in Fig. 5 or to the rear, to right in Fig. 3, will close the tracer contact 50 for "up" movement, which will energize the "up" clutch and the resulting motion will relieve the pressure. If the longitudinal slide 13 and the template 58 are moved to the right as shown in Fig. 5, then the pressure on the contact tracer arm 47 is relieved and the contact 51 is closed to energize the "down" clutch, causing a corresponding change in the angular position of the cam and moving the tracer 46 bodily down until the engagement of the arm 47 with the template again breaks the circuit at contact 51. On account of the angular position of the tracer arm 47, representing the angle of undercut, motion of the cross feed slide to the rear, in following the form cutter profile, will similarly open the contact 51.

It may be said that normally the pressure is such that neither of the contacts 51 or 50 is closed, but, as a matter of fact, when the motion of the slides is such as to continually decrease the pressure on the tracer arm 47 the contact 51 will be repeatedly closed and opened, while with continually increasing pressure the contact 50 will be repeatedly opened and closed.

In operation, it is preferred to control the feeds, both longitudinal and transverse, operating through magnetic clutches, by means of an electric tracer following a pattern representing the contour or profile of the form cutter. This form of control is well known in many shops and is substantially the same as described in the Shaw patent hereinbefore referred to. By longitudinal feed, the slide or carriage 13 is moved longitudinally of the bed, and, since the cross feed slide 12 which has controlled transverse motion, is supported on this carriage, the support 60 with the template 58 is subject to movement both transversely and longitudinally and the tool is moved relatively to the cutter 5. As the cutter (5) is being rotated by the spindle 4 in the usual manner, the spindle is driving the shaft 9 in timed relation with the cutter to rotate the cam 10 and reciprocate the tool for the relieving operation.

When the tracer arm 47, as previously stated, is under normal pressure contact with the edge 57 of the template 58, both of the contacts 50 and 51 will be open, and both of the magnetic clutches 40 will be deenergized. Accordingly the floating gears 27 of the differential are held stationary and there will be no change in the angular position of the cam while the latter, through the gears of the differential is being rotated for the relieving operation. Assuming the machine is in operation, and that, for instance, the feed of the carriage 13, (longitudinal feed) is to the right, as seen in Figs. 1 and 2, the template 58 will be moved to the right, thus continually relieving the pressure on the tracer arm 47. When the template has moved sufficiently to the right the pressure on the tracer arm 47 will be reduced so that the spring 52 will close the upper contact 51, thus, as will be seen from the wiring diagram, Fig. 8, closing the circuit of the "down" relay 86, which in turn closes the high voltage circuit through the point 89 and energize the "down" magnetic clutch 40. This clutch, operating through the worm 36 will rotate the floating gear cage 34 and through gear 42 and rack 43 move the slide bar 44, supporting the tracer 46 downward until the pressure against tracer arm 47 is again sufficient to break the circuit at contact 51. Rotation of the cage or floating gear casing 34 in the proper direction as the tracer arm 47 is continually kept in contact with the edge 57 of the moving template, will shift the angular position of the cam, so that the relieving operation follows the teeth of a helically gashed cutter, the lead of which is represented by the angle to the horizontal of the edge 57 of the template.

When the tool carriage 13 has been moved longitudinally in the direction of feed until the cross slide 12 begins, for instance, to move in or to the right in Fig. 3, according to the profile of the cutter, then there will be joint control as a result of the longitudinal and transverse motions of the template 58. The effect of the longitudinal motion has been described, now with inward motion of the cross feed slide, the bracket 60 and the template 58 are moved inward, thereby bringing pressure on the lower edge of the tracer arm 47 which, as previously explained, is set at the angle of rake or undercut, see Fig. 3. Increased pressure on the tracer arm 47, in opposition to the spring 52, will tend to open contact 51, which controls down movement of the slide bar 44, and likewise down movement of the tracer. At this stage, then, both the longitudinal and transverse motions are jointly operating on the template and the tracer arm 47 will be influenced to open or close contact 51 according to the resultant effect of the two motions. For instance, if, as assumed above, the longitudinal feed is to the right and the transverse feed to the rear, motion of the template to the right will decrease the pressure on tracer arm 47 and to the rear will increase it, so that if the effects balance the angular position of the cam will not be changed. But, if the resultant is a decrease of pressure on the arm 47, contact 51 will be closed for down motion; and contact 50 for up motion if the resultant is an increase in pressure. Of course, the angular position of the cam or the effect of the motions of the template thereon, will vary according to the motions, longitudinal, right or left and transverse, in or out, but from the described effects of motion to the "right" and "in", the effect of any of the motions alone or jointly with another, will be understood. In any case the floating gears in the differential are moved by the clutches 40 in proper direction to compensate for the change in position, circumferentially, of the edge of the cutter tooth to be relieved, it being remembered that the angle at which the tracer arm 47 is positioned represents the rake or undercut given to the cutter teeth, and the angle of template 58 represents the angle of the helix of the teeth.

From the above, it will be seen that this improved mechanism provides for controlling the angular position of the cam during the relieving operation upon cutters of various types, either straight gashed or helically gashed and with teeth having any usual angle of undercut. This is made possible by having the template 57—58 pivoted for adjustment to different angles to take care of varying angles of lead from straight gashed to helically gashed, either right or left, while with the angularly adjustable tracer 46, it is possible to control the position of the cam for the relieving of form cutters with rake or undercut of the teeth of varying angles independently of or in combination with any control of the advance or retard in the angular position of the cam as a result of the tracer following the edge of the template.

While this improved control of the advance and retard of the angular position of one rotating member relative to another has been described in connection with the cutter and relieving cam of a relieving lathe, it is obvious that the differential gear and electro-magnetic clutch control of such advance or retard of rotation of a member by opening and closing contacts controlling the circuits of the respective magnetic clutches can be utilized in other types of machines and in different arrangements and combinations. Hence, certain features of the improvement are claimed broadly, for it is believed that widely varying adaptations of the circumferential rotation of the floating gears of the differential by electro-magnetic means or magnetic clutches for increasing or decreasing the speed of rotation of one member relative to another are within the scope of the invention.

It will be understood, however, that while in the present instance the preferred arrangement of mechanism for the advance and retard of the angular position of the relieving cam has been shown and described, various modifications therein and in the specific details of construction and the arrangement of circuits and controls may be made without departing from the spirit and scope of the invention.

I claim:—

1. A mechanism for increasing and decreasing the speed of rotation of a rotating member, comprising in combination, means for rotating said member through a differential gear, the floating gears of the differential being mounted for rotation circumferentially, rotary electromagnetic means for rotating said floating gears, electrical circuits and switches for controlling energization of said electromagnetic means to effect an increase or decrease in the speed of rotation of said member, and a template following tracer for controlling said circuits.

2. The mechanism as in claim 1 wherein the electromagnetic means for rotating the floating gears comprises a continuously rotating magnetic clutch adapted to be energized for rotating the floating gears to effect the increase or decrease in the speed of rotation of said member.

3. A cutter relieving lathe comprising a relieving cam, a shaft for rotating the relieving cam in timed relation to the cutter, differential gear mechanism through which said shaft drives the cam, a pair of motor driven magnetic clutches rotating in opposite directions and arranged to change the relation of the ears of said differential for advancing or retarding the angular position of the cam, circuits for said clutches and means for closing the circuits of the respective magnetic clutches according to whether the angular position of the cam is to be advanced or retarded.

4. A cutter relieving lathe comprising a spindle for rotating the cutter, a cam rotating shaft geared to said spindle for rotation in timed relation to the cutter, a cam for reciprocating the tool for the relieving operation, a differential gear between said shaft and the cam, means for changing the relation of the gears of said differential to advance or retard the angular position of the relieving cam, a template, a tracer cooperating with said template for controlling changes in the relation of said differential gears and means for mounting the tracer and template for relative motions corresponding to the normal feeds of the lathe.

5. A cutter relieving lathe comprising a spindle for rotating the cutter, a cam for reciprocating the tool in the relieving operation, a shaft geared to the spindle for operating the cam in timed relation to the cutter, a differential gear through which the cam is driven from said shaft, means for changing the relation of the gears of the differential for advancing or retarding the angular position of the cam to facilitate relieving helically gashed cutters, a template having its edge angularly disposed according to the angle of lead of the gash in the cutter, a tracer adapted to cooperate with the edge of said template and means controlled by said tracer as it follows the template for changing the relation of the gears of the differential for advancing or retarding the angular position of the cam during feed of the tool axially of the cutter.

6. The cutter relieving lathe as in claim 5, wherein said tracer is mounted on a slidable rack geared to said means for changing the relation of the gears of the differential to thereby control any such change for advancing or retarding the angular position of the cam.

7. A cutter relieving lathe comprising a spindle for rotating the cutter, a cam for reciprocating the tool in the relieving operation, a shaft geared to the spindle for rotating the cam in timed relation to the cutter, a differential gear between the spindle and cam for rotating the latter and arranged for changing the relative angular position of the cam, a member supporting the floating gears of said differential for rotation angularly, means for rotating said members in one direction or another to vary the angular position thereof and thereby vary the relative angular position between the spindle and cam, a rack geared to said member and adapted to slide as said member is rotated, a tracer mounted for movement with said rack, a template for cooperation with said tracer during normal feed of the tool for controlling movements of said floating gear member to vary the angularity between the spindle and cam and means for changing the angular position between the tracer and template to conform to any changes in the circumferential position of the cutting edges of the teeth of the cutter.

8. The cutter relieving lathe as in claim 7, wherein the angular relation between the tracer and template may be varied in two directions at right angles, one in a plane parallel with the cross feed and the other in a plane parallel with the longitudinal feed of the lathe to vary the control of the relative angular position between the cutter and cam according to the undercut and/or lead of the teeth of the cutter.

9. A cutter relieving lathe comprising a spindle for rotating the cutter, a cam for reciprocating the tool in the relieving operation, a shaft geared to the spindle for rotating the cam in timed relation with the cutter, a differential gear between said shaft and the cam through which the cam is rotated, a member supporting the floating gears of the differential for circumferential displacement for advancing or retarding the angular position of the cam, oppositely rotating magnetic clutches for rotating said floating gear member in one direction or another, a rack geared to said member for sliding movement corresponding with rotation of the floating gear member by the clutches, a tracer supported on said rack and provided with contacts for closing circuits to the respective magnetic clutches, a straight edge template mounted parallel to the axis of the cutter for longitudinal feed with the tool and adapted in cooperation with said tracer to control the angular position of said floating gears through the opening and closing of said contacts as an incident to longitudinal feed of the template.

10. The cutter relieving lathe as in claim 9, wherein the angular position of the edge of said template represents the lead of the gash in the cutter and means is provided for changing the angle of the template to correspond with the lead of the gash for differently gashed cutters including either right or left helical.

11. A cutter relieving lathe comprising a cam rotatable for the relieving operation, differential gear mechanism for advancing or retarding the rotation of the cam for relieving helically gashed cutters, a tracer controlling the angular position of gears of the differential to advance or retard the angular position of the cam, a template provided with a straight edge for cooperation with said tracer, said edge being in a plane parallel with the axis of the cutter and at an angle thereto corresponding with the lead of the gash in the cutter, means for mounting said template so that the angle of the straight edge thereof may be changed for cutters having different leads and means for mounting said template for cooperation with the tracer during normal feeds of the lathe.

12. The cutter relieving lathe as in claim 11, wherein said template is pivotally supported for changing the angle of its edge and a graduated segment concentric with the pivot cooperates with a zero line, from which the angular position of the edge may be determined by direct reading.

13. A cutter relieving lathe comprising a work supporting and rotating spindle, a cam for reciprocating the tool in the relieving operation during rotation of said spindle, a tool carriage movable longitudinally of the lathe bed, upon which said cam is supported, differential gear mechanism through which said cam is rotated in timed relation to the work spindle, means for mounting said differential gear mechanism in fixed position on the lathe bed, connections between the gears of the differential and the cam adapted to permit longitudinal movement of the cam with the tool carriage while rotation thereof through the differential continues, means for changing the relation of gears of the differential for advancing or retarding the angular position of said cam and a tracer cooperating with a template for controlling changes in the relation of the gears of the differential to advance or retard the angular position of the cam.

14. The relieving lathe as in claim 13, wherein the tracer is mounted in a fixed position with the differential gear mechanism and the cooperating template is supported on the tool carriage for motion therewith, the tracer being supported in cooperative relation with the means for changing the relation of the gears of the differential for controlling the advance or retard of the angular position of the cam.

15. The cutter relieving lathe as in claim 13, wherein said tool carriage is provided with a cross feed slide movable transversely of the cutter and means is provided for mounting said template on the cross feed slide for transverse motion and the tracer for cooperation therewith is in fixed position for control of the gears of the differential and is adapted for cooperation with the template in any transverse position of the cross feed slide.

16. The angular position advancing or retarding mechanism as in claim 1, wherein the means for effecting circumferential movements of the floating gears comprises a pair of magnetic clutches rotating in opposite directions, and electrical means being provided with contacts for opening and closing circuits of the respective magnetic clutches for controlling the advance and retard of the angular position of the member rotated by said shaft.

17. The angular position advancing and retarding mechanism as in claim 1, wherein said intermediate or floating gears are mounted in a rotatable cage for circumferential movement, a rack being geared to said cage and slidable transversely of the axis of the differential supports, and there being a tracer adapted by cooperation with a template or pattern for controlling said means for effecting circumferential movement of the floating gears.

18. A cutter relieving lathe comprising a cross feed slide, a longitudinal feed slide upon which the cross feed slide is mounted, a cam supported on the cross feed slide for reciprocating the tool for the relieving operation during longitudinal and transverse feeds of said slides, a spindle for rotating the cutter, a shaft geared to the spindle for rotation of the relieving cam in timed relation with the cutter, a differential gear between the shaft and the cam through which the cam is rotated, said differential being mounted on the lathe bed in fixed relation to the spindle, splined connections between the differential and the cam to permit longitudinal and transverse feed motions of the cam with the respective slides, a rotatable member supporting the floating gears of the differential for angular displacement, a pair of oppositely rotating magnetic clutches adapted for rotating said floating gear member in one direction or another to advance or retard the angular position of the cam during the relieving operation, a rack slidable transversely of and geared to said floating gear member for synchronous movement therewith, an electric tracer supported on said rack bar and provided with contacts for closing circuits to the respective magnetic clutches, a template comprising a pivoted straight edge for cooperation with the electric tracer for opening and closing said clutch circuits to control the advance and retard of the angular position of said cam, means for supporting said template on the cross feed slide for longitudinal and transverse feed motions therewith, the arrangement being such that the template by partaking of the longitudinal and transverse feed motions of the slides is adapted in cooperation with the tracer to open and close the magnetic clutch circuits for controlling the advance and retard of the angular position of the cam during the relieving operation.

19. The cutter relieving lathe as in claim 18, wherein said tracer comprises a pivoted lever, with a knife edge extending in a plane transversely of and substantially at right angles to the plane of the template and means is provided for supporting the tracer lever on said slidable rack bar for angular adjustment to vary the angle of the tracer lever knife edge to the plane of said template.

20. The cutter relieving lathe as in claim 18, wherein said straight edge template is pivotally mounted on a bracket support on the cross feed slide for angular adjustment according to the angle of lead of the gash in the cutter and means is provided for clamping said template in any position of adjustment to thereby provide for the relieving of various cutters either straight gashed or gashed right or left helical.

21. A cutter relieving lathe comprising a cam for reciprocating the tool for the relieving operation, a shaft for rotating said cam in timed relation with the cutter to be relieved, differential gears between said shaft and the cam through which the cam is rotated, a member supporting the floating gears of the differential for rotation circumferentially to change the angular position of the cam, a pair of oppositely rotating magnetic clutches for rotating said supporting member and the floating gears to advance or retard the angular position of the cam, a rack geared to said floating gear supporting member and mounted to slide up and down transversely of said shaft as said member with the floating gears are rotated, a pivoted contact carrying lever mounted on said rack provided with contacts for closing and opening circuits of said magnetic clutches, one of said contacts being closed for up motion and the other for down motion of said rack and a template having a straight edge cooperating with said contact carrying lever to control the angular position of said floating gears according to opening and closing of contacts as an incident to the up and down motion of said rack to thereby advance or retard angular position of the cam during the relieving operation.

22. The method of advancing or retarding the angular position of one rotating member relative to another where both members are interconnected for simultaneous rotation in a differential mechanism, which comprises the steps of rotating the differential gears through which one of said members is rotated and controlling the intermediate or floating gears of the differential through magnetic clutches, the circuits of which are controlled by contacts adapted to be opened by a tracer following a template during operation of the mechanism.

23. A mechanism for increasing or decreasing the speed of rotation of one member relative to another which comprises rotating one member through a differential gear the floating gears of which have circumferential movement, a rotating magnetic clutch coupled thereto for rotating said floating gears circumferentially, and a tracer following a template for opening and closing circuits for energizing the magnetic clutch for effecting circumferential movement of the floating gears to increase or decrease the speed of rotation of the member being rotated through the differential.

24. A mechanism for increasing or decreasing the speed of rotation of one member relative to another which comprises rotating one member through a differential gear the floating gears of which have rotation circumferentially in either direction, electromagnetic means coupled thereto for rotating said floating gears circumferentially, electrical circuits, contact switches for opening and closing said circuits for energizing said electromagnetic means, and a tracer following a template for operating said contact switches.

25. A relieving lathe comprising in combination, a base, work supporting and rotating means thereon, a cutting tool supported on said base for longitudinal and transverse movement relative thereto, a template having an outline corresponding to the desired form of the work, a tracer following said template, electrical means controlled by said tracer for moving said tool in conformity with said template, means to reciprocate said tool toward and from said work in synchronism with the rotation of said work and supplemental to said tracer controlled movements, means controlling the starting of said tool reciprocatory movements relative to the rotative position of said work, and means to adjust said controlling means for work pieces having relieved surfaces of varying helices.

26. A relieving lathe comprising in combination, a base, work supporting and rotating means thereon, a cutting tool supported on said base for longitudinal and transverse movement relative thereto, a template having an outline corresponding to the desired form of the work, a tracer following said template, electrical means controlled by said tracer for moving said tool in conformity with said template, means to reciprocate said tool toward and from said work in synchronism with the rotation of said work and supplemental to said tracer controlled movements, and means including a tracer and an angularly adjustable bar for controlling the starting of said tool reciprocatory movements relative to the rotative position of said work.

27. A relieving lathe comprising in combination, a base, work supporting and rotating means thereon, a cutting tool supported on said base for longitudinal and transverse movement relative thereto, a template having an outline corresponding to the desired form of the work, a tracer following said template, electrical means controlled by said tracer for moving said tool in conformity with said template, means to reciprocate said tool toward and from said work in synchronism with the rotation of said work and supplemental to said tracer controlled movements, and means including a tracer disposed in a plane transversely of said base and an elongated bar engaged thereby, said bar being disposed in a plane parallel to said base for controlling the starting of said tool reciprocatory movements relative to the rotative position of said work.

28. A relieving lathe comprising in combination, a base, work supporting and rotating means thereon, a cutting tool supported on said base for longitudinal and transverse movement relative theerto, a template having an outline corresponding to the desired form of the work, a tracer following said template, electrical means controlled by said tracer for moving said tool in conformity with said template, means to reciprocate said tool toward and from said work in synchronism with the rotation of said work and supplemental to said tracer controlled movements, and means including a tracer disposed in a plane transversely of said base and an angularly adjustable elongated bar engaged thereby, said bar being disposed in a plane parallel to said base for controlling the starting of said tool reciprocatory movements relative to the rotative position of said work.

29. A relieving lathe comprising in combination, a base, work supporting and rotating means thereon, a cutting tool supported on said base for longitudinal and transverse movement relative thereto, a template having an outline corresponding to the desired form of the work, a tracer following said template, electrical means controlled by said tracer for moving said tool in conformity with said template, means to reciprocate said tool toward and from said work in synchronism with the rotation of said work and supplemental to said tracer controlled movements, and means including an angularly adjustable tracer disposed in a plane transversely of said base and an angularly adjustable elongated bar engaged thereby, said bar being disposed in a plane parallel to said base for controlling the starting of said tool reciprocatory movements relative to the rotative position of said work.

ROBERT D. SHAW.